March 3, 1964     T. L. DALE     3,122,771

WINDSHIELD WIPER

Filed July 22, 1959

INVENTOR.
THOMAS L. DALE
BY
Schmieding and Fultz

United States Patent Office 3,122,771
Patented Mar. 3, 1964

3,122,771
WINDSHIELD WIPER
Thomas L. Dale, 698 Neil Ave., Columbus, Ohio, assignor of forty percent to Palmer Fultz, Columbus, Ohio
Filed July 22, 1959, Ser. No. 828,889
4 Claims. (Cl. 15—250.36)

This invention relates to windshield wiping devices and particularly to a novel cover for renewing the worn surfaces on a used wiper blade.

In general, the cover device of the present invention consists of a flexible strip of rubber material of the same or similar type used in the manufacture of wiper blades. The flexible strip includes a longitudinally extending open-sided slot that divides the strip into spaced side walls forming confronting inner surfaces that are cemented to the worn outer surfaces of a used wiper blade. When the flexible strip is so mounted on a worn wiper blade, the outer surfaces of the spaced side walls of the strip form new wiping surfaces for efficiently contacting and removing water from a windshield.

As one aspect of the present invention, the flexible cover strip can be cemented to a worn wiper blade by applying a rubber base cement to the contacting surfaces in the conventional manner.

As another aspect of the present invention, the flexible cover strip can be manufactured and supplied to users with a flexible peel-off type of backing which overlies a coating of an unhardened self-curing mastic.

As another aspect of the present invention, the flexible cover strip material can be produced in long lengths by a continuous extrusion process and sold in the bulk to service stations and other sales outlets who can conveniently cut required lengths from the bulk supply and thereby avoid the necessity of maintaining a large inventory of various lengths for different models of wiper blades.

It is another aspect of the present invention to provide a flexible cover for repairing wiper blades that have become torn or broken such as occasionally occurs, particularly at the ends of conventional wiper blades.

As another aspect of the present invention, the flexible cover, when applied to a wiper blade, provides an assembly of greater thickness than the wiper blade alone. This serves to increase the tension of the convention springs by urging the wiper blade against the windshield and hence increases the effectiveness of an assembly wherein the springs have lost some of their tension.

Further aspects and advantages of the present invention will be apparent from the following description, reference being had to the accompanying drawings wherein preferred forms of embodiments of the invention are clearly shown.

Figure 1:
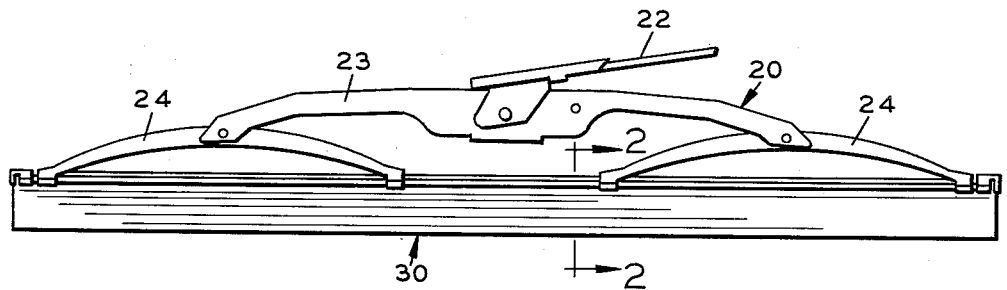
FIG. 1 is a side elevational view of a conventional windshield wiper blade and mount with the cover strip attachment of the present invention installed thereon.

Referring in detail to the drawings, FIG. 1 illustrates a windshield wiper assembly indicated generally at 20 that includes a metal blade mount 21 attached to a wiper arm 22 by a yoke 23 and spring elements 24.

A conventional rubber wiper blade 26 is removably mounted in metal blade mount 21 by flanges 27.

A cover strip constructed according to the present invention is indicated generally at 30 and in its normal extruded or molded configuration includes flexible or resilient side walls 32 and 33 separated by an open-ended slot 34.

Figure 2:
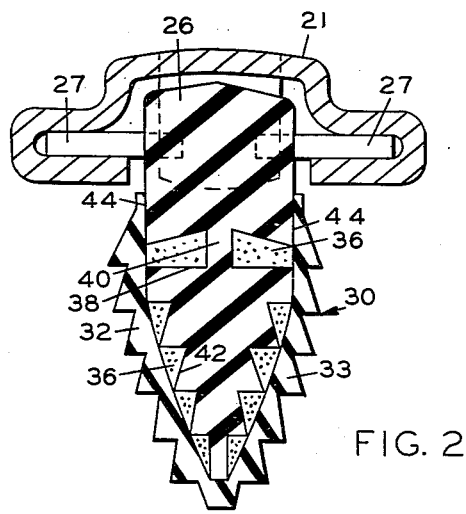
FIG. 2 is an end sectional view of the blade, blade mount, and cover strip of FIG. 1, the section being taken along the line 2—2 of FIG. 1.

In FIG. 2, cover strip 30 is shown attached to blade 26 by a suitable mastic 36. The various self-curing rubber base cements have been found particularly suitable for use as mastic 36 but other suitable mastics can, of course, be used without departing from the spirit of the present invention.

When cover strip 30 is attached to blade 26, as seen in FIG. 2, side walls 32 and 33 are spread apart and when placed over the blade assume the bowed configuration conforming with the shape of the curved outer side walls of blade 26.

With reference to FIG. 2, it should be pointed out that the recesses 38 formed by the neck portion 40 of blade 26 and the recesses 42, formed by the successive wiping edges of blade 26, form pockets for receiving quantities of mastic whereby cover strip 30 can be most effectively cemented to blade 26.

In addition, the confronting flat side surfaces of blade 26 and cover strip 30 are coated with a thin layer of mastic as is indicated at the junctions 44.

Figure 3:
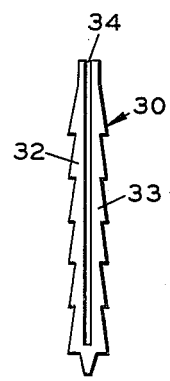
FIG. 3 is an end elevational view of the cover strip of the preceding figures and illustrating said strip in a normal unflexed configuration.
Figure 4:
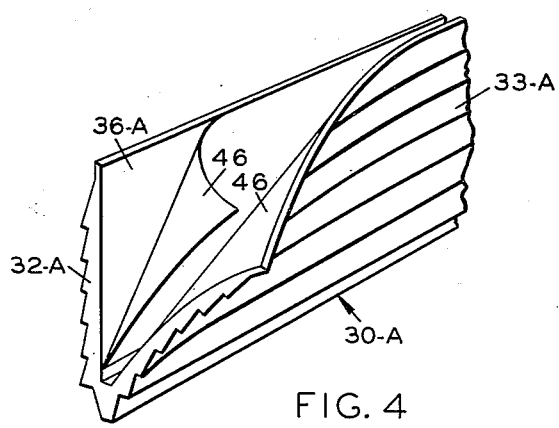
FIG. 4 is a partial perspective view of a modified cover strip provided with a peel-off backing constructed according to the present invention and comprising a second aspect thereof.

Reference is next made to FIG. 4 which illustrates a modified cover element indicated generally at 30A which is identical to the cover element 30 of FIG. 3 except that the inner surfaces of the side walls 32A and 33A are provided with a peel-off backing 46, formed of woven cloth material, or the like, under which is disposed a layer of mastic 36A. Peel-off backing 46 and mastic 36A may be of the type used for patching punctured inner tubes.

In operation, the cover strip material is preferably supplied in long bulk lengths to avoid the necessity of the seller carrying a large inventory of various sizes. When a customer requires wiper blades to be resurfaced or repaired, the seller need only measure the blade length and cut strips of appropriate length from the bulk supply.

If the unsurfaced strip material of FIG. 3 is being installed the wiping surfaces of the worn blade 26 are coated with self-curing rubber cement, or other suitable mastic, and the strip 30 is next spread open and pressed in place whereby the inherent resiliency of strip 30 will grip blade 26 until the rubber cement has dried.

If strip material 30A, FIG. 4, provided with a peel-off backing 46 is being used, the seller need cut only the appropriate lengths, peel the cloth backing strips 46 off, press the cover strip in position over the old wiper blade. Here again, the inherent resiliency of the spread side wall will retain the cover 30A in position until the mastic 36A has hardened.

While the forms of embodiments of the present invention as herein disclosed constitute preferred forms, it is to be understood that other forms might be adopted, all coming within the scope of the claims which follow:

I claim:

1. A windshield wiper blade cover for assembly on a windshield wiper blade having a worn wiper surface to provide a new wiping surface therefor, said cover comprising an elongated flexible body strip, a slot extending axially for the entire length of said body strip of a width less than the average width of the worn wiper blade and forming spaced opposed flexible side walls extending the entire length of said body strip, said side walls having inner opposed surfaces for tight surface engagement with the outer free surface of the worn wiper blade, and an adhesive film on substantially the entire area of said inner opposed surfaces of said side walls.

2. A windshield wiper blade construction in accordance with claim 1 which further includes a removable flexible backing detachably secured to the adhesive film on the inner opposed surfaces of the flexible side walls.

3. A resurfaced windshield wiper blade assembly comprising, in combination, an elongated resilient worn wiper blade having inclined surfaces converging inwardly to an apex, means for securing said worn wiper blade to a blade support, an elongated resilient wiper blade cover secured to said worn wiper blade in tight enveloping relationship, said wiper blade cover having a slot extending axially for the entire length of said wiper blade cover forming spaced flexible side walls having opposed inner surfaces spaced from one another, the inner surface of each side wall being in tight flexed surface engagement throughout its length with the respective inclined surfaces of said worn wiper blade, and measn securing said worn wiper blade and said wiper blade cover to one another in surface to surface engagement.

4. A resurfaced windshield wiper blade assembly comprising, in combination, an elongated resilient worn wiper blade having inclined surfaces converging inwardly to an apex, said inclined surfaces provided with a plurality of spaced protrusions forming original wiping elements, means for securing said worn wiper blade to a blade support, an elongated resilient wiper blade cover secured to said worn wiper blade in tight enveloping relationship, said wiper blade cover having a slot extending axially for the entire length of said worn resilient wiper blade forming spaced flexible side walls having opposed inner surfaces spaced from one another, the inner surface of each side wall being in tight flexed surface engagement throughout its length with the respective inclined surfaces of said worn wiper blade, and mastic between the inner surfaces of said side walls and said inclined surfaces to adhesively bond said wiping blade cover to said worn wiping blade.

References Cited in the file of this patent
UNITED STATES PATENTS

| | | |
|---|---|---|
| Re. 21,367 | Ryan | Feb. 20, 1940 |
| 2,051,668 | Zaiger | Aug. 18, 1936 |
| 2,908,028 | Runton et al. | Oct. 13, 1959 |
| 2,913,745 | Welvang | Nov. 24, 1959 |
| 2,926,375 | Flynn | Mar. 1, 1960 |